Oct. 30, 1945.   J. F. JAROS   2,387,758
VISUAL EDUCATIONAL DEVICE
Filed Aug. 4, 1941   6 Sheets-Sheet 1

Inventor:
Joseph F. Jaros

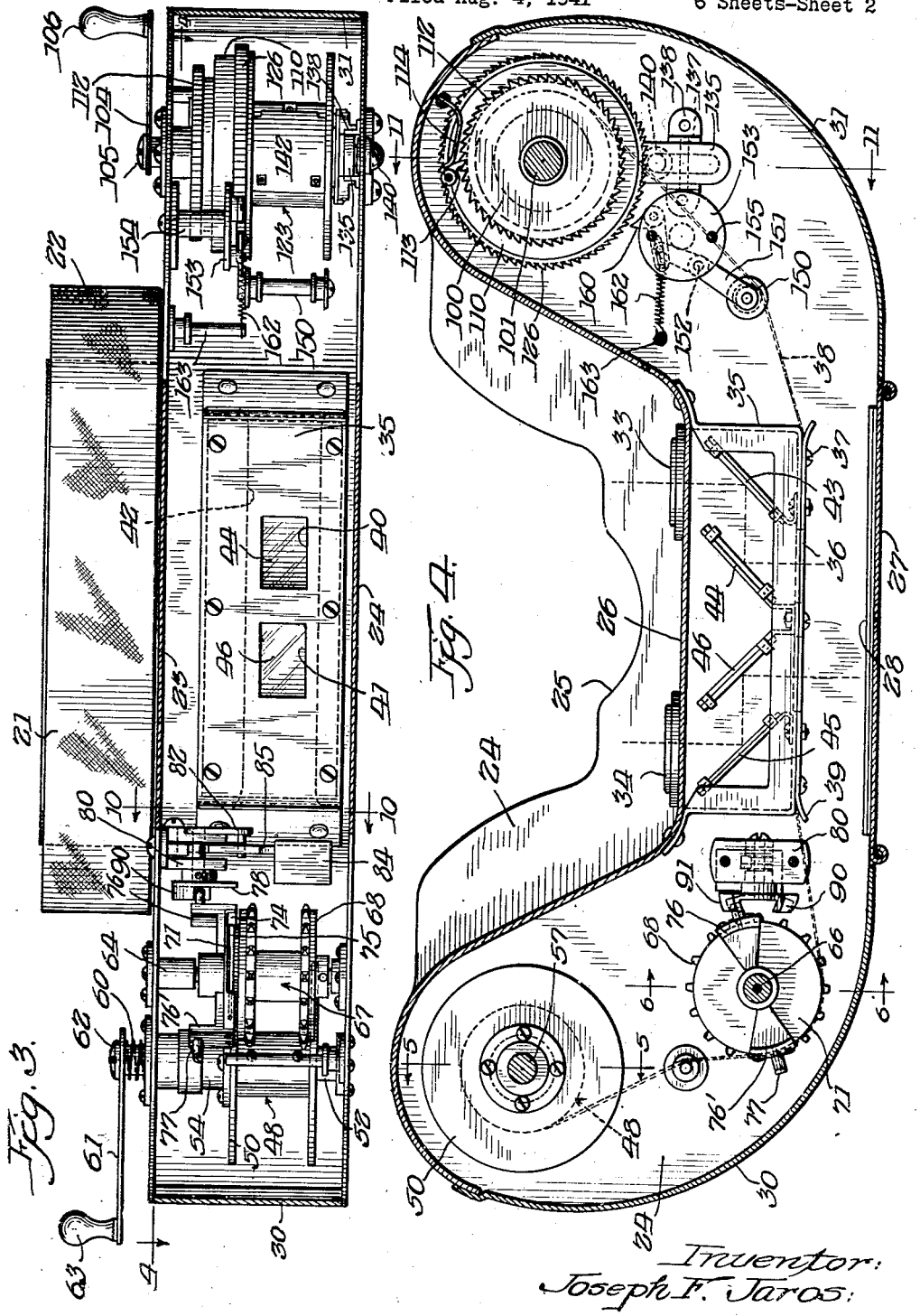

Oct. 30, 1945. J. F. JAROS 2,387,758
VISUAL EDUCATIONAL DEVICE
Filed Aug. 4, 1941 6 Sheets-Sheet 3
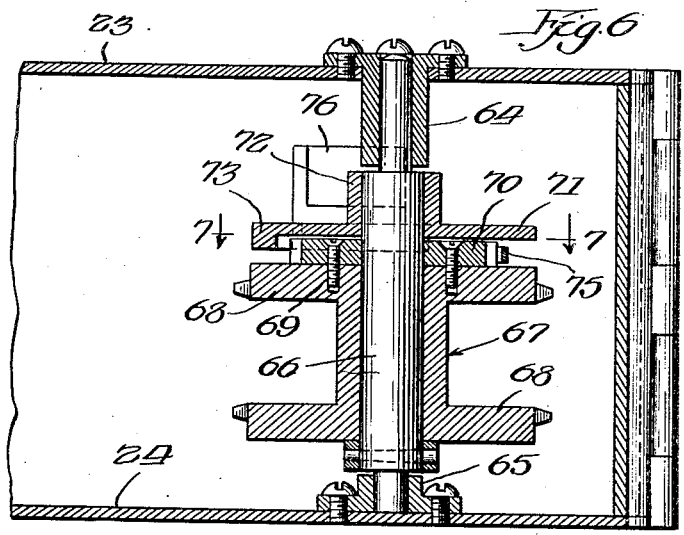
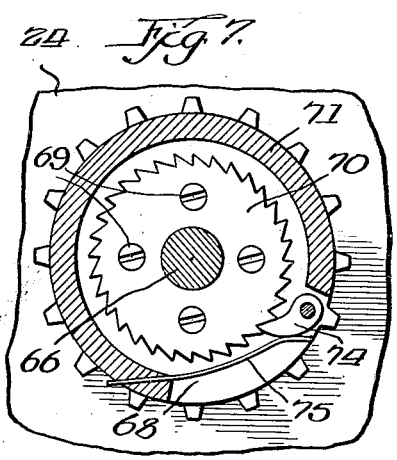
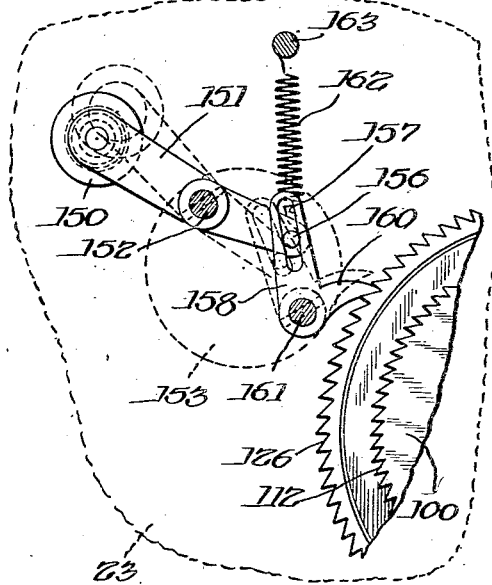
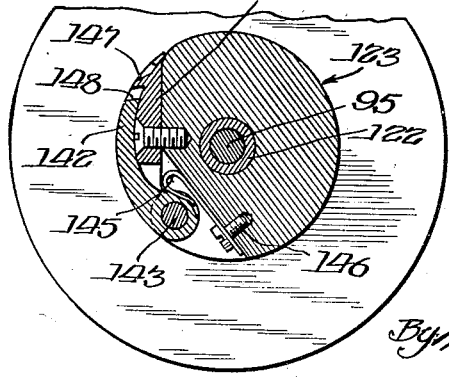
Inventor:
Joseph F. Jaros Inventor:
Joseph F. Jaros Oct. 30, 1945.  J. F. JAROS  2,387,758
VISUAL EDUCATIONAL DEVICE
Filed Aug. 4, 1941  6 Sheets-Sheet 5
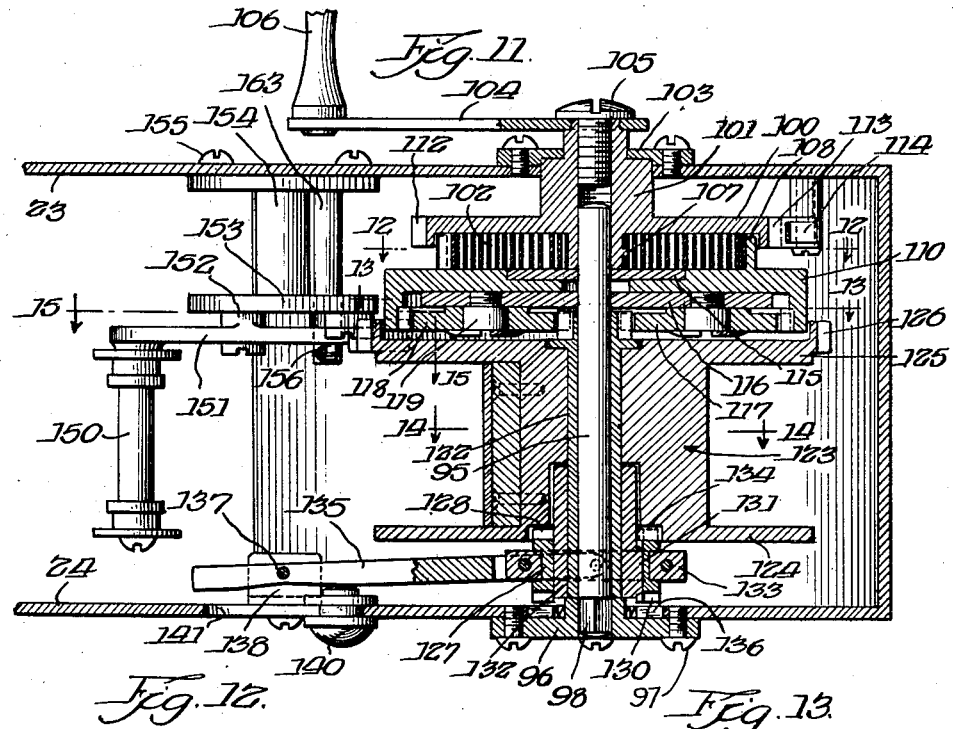
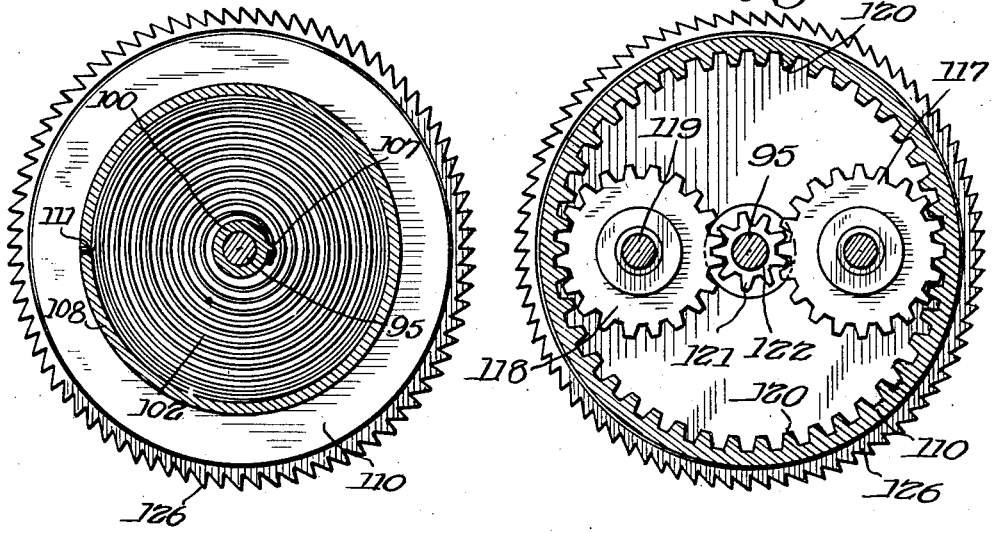
Inventor:
Joseph F. Jaros

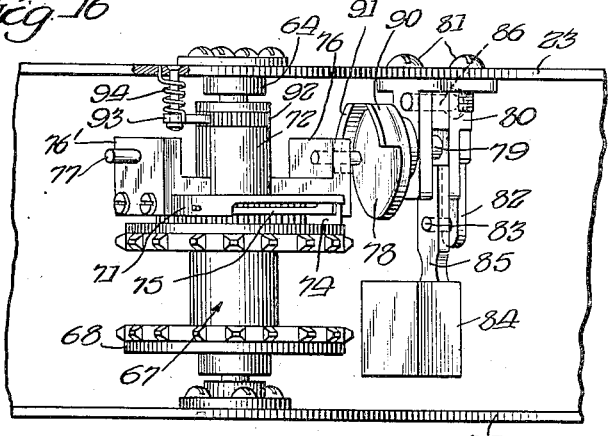
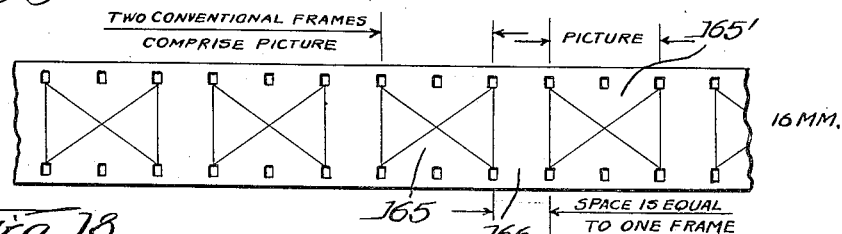
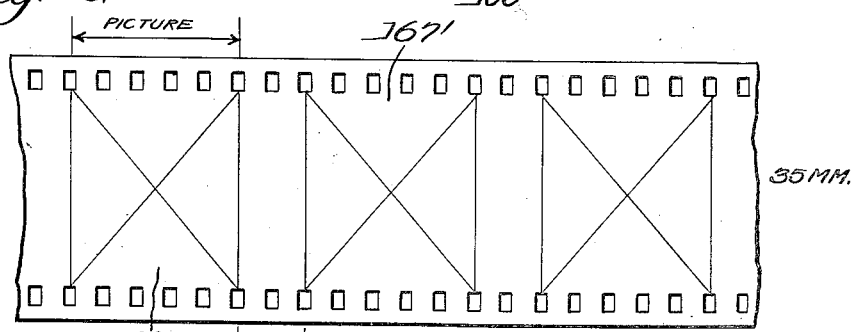
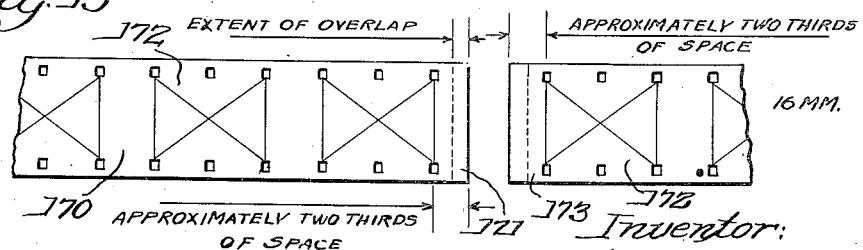

Patented Oct. 30, 1945

2,387,758

UNITED STATES PATENT OFFICE 2,387,758

VISUAL EDUCATIONAL DEVICE

Joseph F. Jaros, Riverside, Ill., assignor to Elizabeth C. Jaros, Chicago, Ill.

Application August 4, 1941, Serial No. 405,308

20 Claims. (Cl. 88—31)

The invention relates to visual educational devices and has particular reference to a compact, portable apparatus for attachment to the head of the user in proper alignment with the eyes whereby the user may view pictures in stereoscopic relief.

The educational device of the invention embodies automatic mechanism for advancing film to bring different pictures into view and the primary object resides in the provision of control means therefor, whereby the user of the device may advance the pictures in succession and at desired times while leaving the hands free, since the invention contemplates that the user will be performing operations such as experiments or any other work either on a table or on the wall in accordance with instructions, diagrams, or other information visually indicated by the pictures caused to pass through the apparatus. Therefore, a more specific object of the invention is to provide apparatus for viewing pictures that can be carried as an attachment releasably fitted to the head so as to leave the arms free for other operations and which will enable the user to view the pictures by directing his eyes straight ahead, for example, and also perform said operations as by casting his eyes downwardly. This bi-focal aspect of the invented device is very important since it enables full realization of the educational features thereof.

Another object of the invention is to provide power means for advancing the film; to provide escapement mechanism for controlling the extent of movement of the film so that the same is advanced the desired distance to bring successive pictures into view; and to provide improvements in the control of the escapement mechanism so that the user may release the same by bodily movement of the device, for example, by electric means, by a cable release actuated by the foot or hands, by sound waves, radio waves or by a timing device.

Another object is to provide a visual educational device having spring energized motor means for winding the film.

Another object is to provide manually actuated clutch means for operatively connecting the motor with the wind-up spool for the film and which will additionally incorporate a tension lock preventing operation of the motor except when the film is in proper position for winding and under a predetermined tension.

A further object of the invention is to provide an optical system for the visual educational device herein described which will enable the user to view the pictures in stereoscopic relief, and to provide an optical system wherein the picture frames will be spaced a convenient distance apart such as will permit splicing of the film and which will also make possible the location of the lenses at the proper pupillary distance without exaggerating the depth of the optical system.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 3 is a view with the front wall removed showing in elevation the optical system and the mechanism for handling the film;

Figure 4 is a horizontal sectional view taken longitudinally through the device substantially along line 4—4 of Figure 3;

Figure 6 is a vertical sectional view taken along line 6—6 of Figure 4, showing the sprocket and escapement mechanism;

Figure 7 is a sectional view taken substantially along line 7—7 of Figure 6;

Figure 11 is a vertical sectional view along line 11—11 of Figure 4 showing the construction of the spring energized motor means, the planetary gearing combined therewith, the wind-up spool for the film and the clutch control means;

Figure 12 is a horizontal sectional view along line 12—12 of Figure 11;

Figure 13 is a horizontal sectional view along line 13—13 of Figure 11, more particularly illustrating the planetary gearing;

Figure 14 is a horizontal sectional view along line 14—14 of Figure 11, showing in detail the construction of the film holder for attaching the film to the wind-up spool;

Figure 15 is a view taken along line 15—15 of Figure 11, showing the tension lock for the motor means which automatically releases when a predetermined tension is placed on the film;

Figure 16 is an orthographic projection similar to Figure 8, showing a modification in construction of the escapement mechanism which permits rewinding of the film while maintaining proper positioning of the escapement mechanism;

Figure 17 is a plan view showing the positioning of two picture frames on a sixteen millimeter film with the desired space therebetween;

Figure 18 illustrates the desired spacing of two picture frames on a thirty-five millimeter film to adapt the same to the optical system of the present invention; and Figure 19 is a plan view illustrating the manner of using the space between picture frames on sixteen millimeter film for splicing the same;

Figure 1:
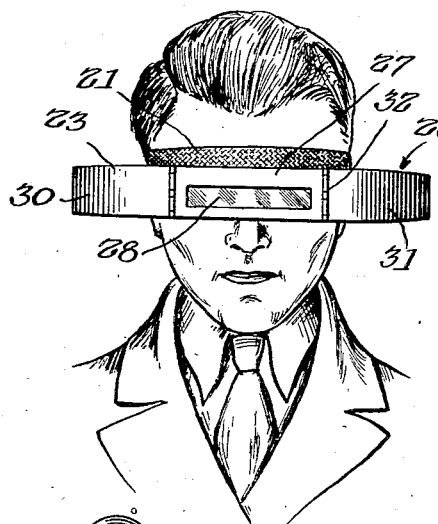
Figure 1 is a view showing the visual educational device of the invention in applied position to the head of a user.
Figure 2:
Figure 2 illustrates the bi-focal aspect of the present device which enables the user to cast his eyes downwardly so as to direct the hands in the performance of certain tasks.

Referring to the drawings, particularly Figures 1 and 2, the visual educational device of the invention illustrated in its entirety by numeral 20 is shown in attached relation to the head of a person so that the pictures caused to pass in succession may be viewed by directing the eyes ahead. For this purpose the frame of the device is provided with an upstanding portion 21 to which is fastened an elastic band 22 adapted to pass around the rear of the head of the user, whereas, the portion 21, which extends upwardly from the top wall 23 of the device, is adapted to contact the forehead of the user. The lower or bottom wall 24 is provided along the inner edge thereof with a formation 25 to enable the user to cast his eyes directly downward to assist his hands in performing certain tasks on the table, which will be performed in accordance with instructions such as may be indicated by the particular pictures viewed by the user. The inner wall 26 of the apparatus, as best shown in Figure 4, positions a plurality of lenses, to be more particularly described, at the proper pupillary distance and which enables the user to view the pictures passing through the machine. The front wall of the frame includes a center section 27 having a glass window 28 for illuminating the pictures on the film as they are located in aligned relation with the optical system, and said front wall additionally includes doors 30 and 31 leading to the mechanism for handling the film and which are suitably pivoted to section 27 by hinges 32.

The optical system

The invention contemplates that the pictures passing through the present device will be viewed in stereoscopic relief. This requires that the pictures be placed on the film in pairs with means being provided in the form of lenses for magnifying said pictures and for viewing both images simultaneously.

Figure 4 illustrates a preferred arrangement of lenses and mirrors whereby the distance between the picture frames on the film is increased to the proper pupillary distance. The rear wall 26 is provided with a right and left hand lens 33 and 34, respectively. The casing 35 is secured to the rear wall 26 on the inside thereof and in alignment with said lenses. The metal strip 36 is secured to the front wall of said casing by screws 37 and in spaced relation therewith so as to provide a passage 42 for the film 38, shown in dotted lines in Figure 4. To facilitate the insertion and movement of the film through said passage it will be observed that the metal strip 36 is flared at its ends as at 39. Said metal strip and also the front wall of casing 35 are provided with substantially rectangular openings 40 and 41, Figure 3, the openings in strip 36 being located in alignment with those in the front wall of the casing. Also said openings are positioned substantially centrally of the passage 42 for the film which, in the illustrated embodiment, has a vertical height to accommodate sixteen millimeter film. Since the pupillary distance between lenses 33 and 34 is greater than the space between the picture frames 40 and 41, it is necessary to provide a system of mirrors within casing 35 which in conjunction with said lenses constitutes the optical system of the present apparatus. For the lens 33 a mirror 43 is positioned within casing 35 and supported in angular facing relation therewith. Adjacent the center of the casing a mirror 44 is located in opposed facing relation with mirror 43 and which directs the image from the picture within frame 40 onto said mirror. In a similar manner mirror 43 will direct the image to lens 33. The same system of mirrors is applied with respect to lens 34. Mirror 45 is supported within casing 35 in an angular facing relation with said lens and the opposed facing mirror 46 is positioned adjacent the center of the casing in parallel arrangement so as to direct the image from frame 41 to said first mentioned mirror. In order to produce the desired stereoscopic effect the pictures in alignment with frames 40 and 41 are photographed from points of view some distance apart and since they are viewed simultaneously by an observer through lenses 33 and 34 the images appear as one and stand out in relief, giving the appearance of depth.

Film supply spool

Figure 5:
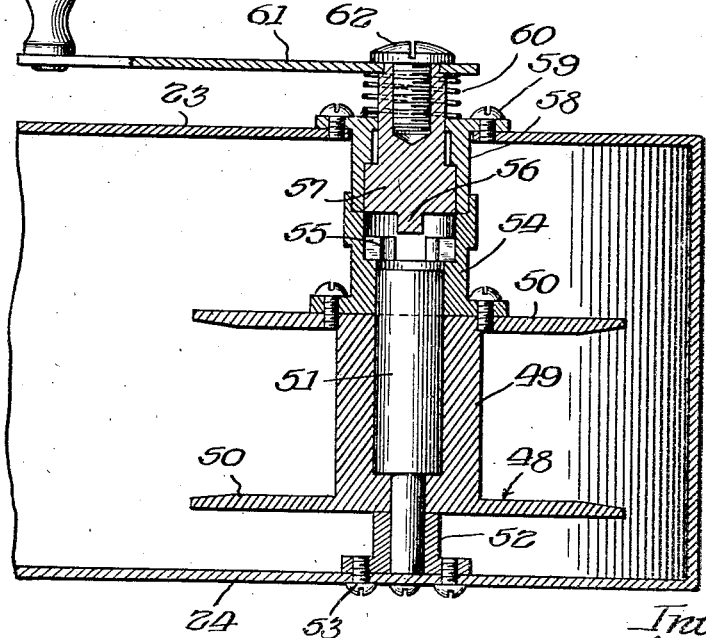
Figure 5 is a vertical sectional view along line 5—5 of Figure 4 illustrating the manner of mounting the supply spool for the film.
Figure 8:
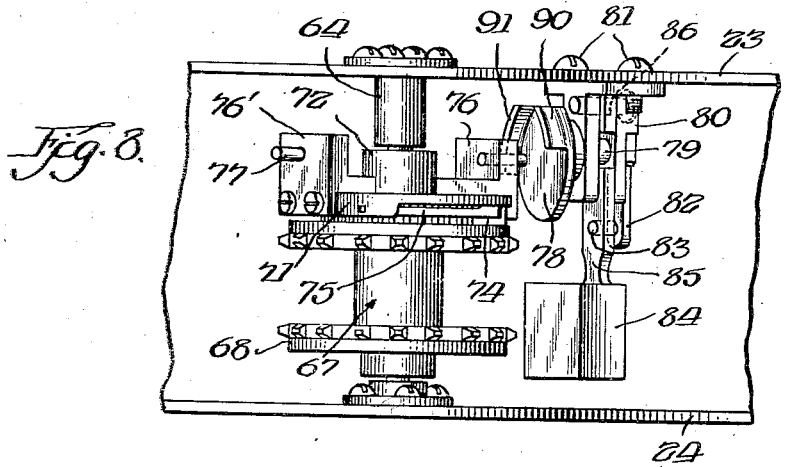
Figure 8 is an orthographic projection on a vertical plane oriented clockwise at an angle to the front elevation showing the sprocket and escapement mechanism illustrating the position of the parts with the film at rest and with the pictures in proper alignment with the optical system.

The film for the visual educational device of the invention is supplied by the spool 48 shown in Figure 5. The film is suitably attached to the hub 49 and spaced flanges 50 confine the film thereon and provide directing means for the film as the same is unwound. Hub 49 of the spool is journalled so as to have free rotation on the upstanding shaft 51 extending vertically upward from the base wall 24 of the frame. The reduced lower end of shaft 51 is supported by bearing 52 secured by screws 53 to wall 24. The upper flange 50 of the spool includes a hub portion 54 centrally recessed and provided with inwardly directed lugs 55 adapted to have interlocking relation with the depending part 56 of the stud shaft 57, which shaft is located within and journalled by the bearing 58 secured to the top wall 23 by screws 59. Stud shaft 57 is adapted to have vertical movement within its bearing 58 and within the recess of the hub portion 54, the parts being aligned for the purpose and as a result of said movement it will be observed that the depending part 56 may be interlocked with the lugs 55 or released therefrom. To maintain the stud shaft 57 in released position, as shown in Figure 5, the projecting end of the shaft has a coil spring 60 in encircling relation therewith. The spring applies sufficient tension against the lever 61 secured to the stud shaft by screw 62 to maintain said shaft elevated so that depending part 56 will be free of lugs 55. Rotation of the stud shaft when in this position by means of handle 63 will not effect the supply spool and also the supply spool will be able to rotate freely without causing rotation of the shaft. However, when it becomes necessary to rewind the film onto spool 48 this can be accomplished by forcing stud shaft 57 downwardly against the tension of spring 60 to cause interlocking engagement of part 56 with lugs 55. When the stud shaft is thus positioned any rotation of the same will be transmitted to the supply spool.

Provision is also made whereby the supply spool 48 may be removed from the frame of the device so that another spool having pictures, for example, relating to a different subject may be substituted for the one removed. It is first of all necessary to remove the screws 59 so that bearing 58 can be withdrawn from wall 23 of the frame. The supply spool and shaft 51 can thereupon be elevated as a unit from bearing 52 and removed from the frame through door 30. Shaft 51 may be retained and fitted to the new spool so that the unit is then replaced and with bearing 58 in associated position and secured to the wall 23 the spool is rendered operative for supplying the film as desired. It is entirely possible to equip the structure above described with other and more simplified arrangements for removing a used supply spool and replacing the same with a new spool and with most of the operative connections with the rewinding handle taking place automatically.

*Sprocket and escapement mechanism*

Figures 4, 6, 8, 9 and 10 illustrate the mechanism for controlling the length of film supplied to the optical system intermittently for any particular pair of pictures which, as previously described, will be viewed by the user as a single image. The top wall 23 of the frame provides the depending bearing 64, whereas, the bottom wall 24 provides the lower bearing 65 suitably secured to the interior wall thereof so as to extend upwardly. These bearings journal the shaft 66, to which is suitably secured the sprocket wheel indicated in its entirety by 67 and including the spaced circular sprocket wheels 68. The sprocket rotates with shaft 66 the ratchet wheel 70 also rotates with the sprocket and shaft since the same is secured thereto by screws 69. The ratchet is shown in plan in Figure 7. The escapement wheel 71, having the hub 72, is loosely mounted on shaft 66 so as to rotate independently thereof and said escapement is also located directly above the ratchet wheel 70. The depending flange 73 extending around the periphery of the wheel 71 has encircling relation with the teeth of the ratchet wheel and this flange for a part of its extent is cut away so that a pawl 74 may be pivotally secured to the escapement wheel, Figure 7. A tension spring 75 is properly held by the flange and directed against the pawl to yieldingly maintain the same in contact with the teeth of the ratchet wheel 70. This construction makes it possible to rotate the sprocket wheel 67 in a reverse direction for rewinding the film even though the escapement wheel 71 is held against movement. In the operation of the device the sprocket wheel is rotated in a counter-clockwise direction, Figure 4, which functions to supply film to the optical system. For rewinding, the sprocket will therefore rotate in a clockwise direction. During rewind it is not desirable for the escapement wheel to rotate although for feeding the film said wheel and sprocket must rotate as a unit with the rotary motion being supplied by the sprocket.

Figure 9:
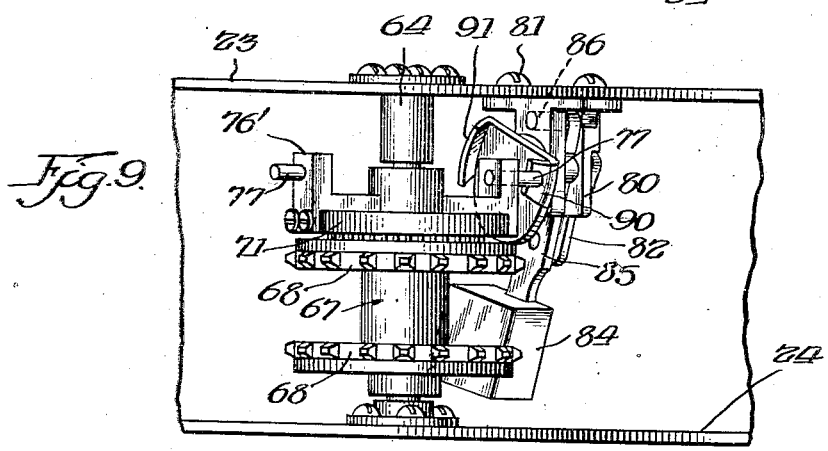
Figure 9 is an orthographic projection similar to Figure 8 but showing an operative position of the sprocket and escapement mechanism.
Figure 10:
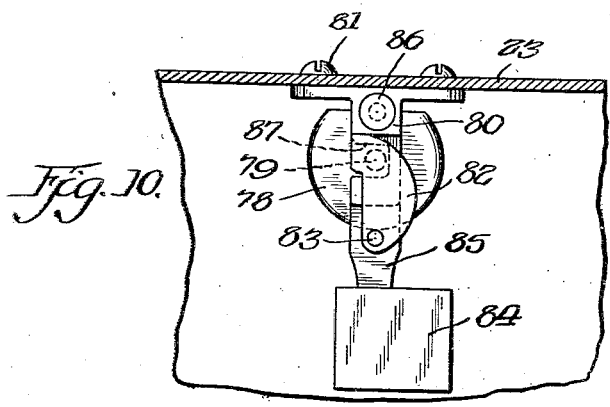
Figure 10 is a view taken substantially along line 10—10 of Figure 4 and showing in side elevation the pendulum control for the escapement mechanism.

The action of the ratchet wheel 70 and pawl 74 is to lock the escapement wheel to the sprocket during feeding of the film which takes place when the sprocket rotates in a counter-clockwise direction. The wheel is provided with two upstanding peripheral flange members 76 and 76', each having a pin 77 projecting therefrom. The mechanism proper for controlling rotation of the escapement wheel and thus the sprocket includes an escapement disc 78 journalled by means of a shaft 79 on the yoke 30 depending from the top wall 23 of the frame and being suitably fastened thereto by screws 81. The end of shaft 79, projecting beyond the yoke, has fastened thereto a depending lever 82 carrying a pin 83. The yoke also pivotally supports a pendulum member including weight 84 and supporting lever 85, the same being pivotally secured to said yoke by the pin 86. The yoke provides a directing channel for controlling the pendulum movement of the weight 84 and supporting lever 85 and as shown in Figure 10, the said lever is recessed as at 87 for receiving shaft 79 of the escapement disc when depending vertically downward. Connection between the escapement disc and the pendulum member is effected by pin 83 which connects lever 82 with the supporting lever 85. Accordingly any movement of the pendulum member will be imparted to shaft 79 to cause rotation of disc 78. Disc 78 carries two peripheral flange portions 90 and 91. Portion 90 is located on the front periphery adjacent the cover 30 of the frame, whereas, portion 91 is located on the rear periphery of the disc. Also it will be observed that portion 90 is of less depth than 91. This construction forms the escapement mechanism for the sprocket since the direction of rotation of the sprocket during feeding of the film is such as to bring a pin 77 first into contact with portion 90 and then into contact with portion 91. With the pendulum member positioned vertically portion 91 will act as a stop with respect to either of the pins 77 and the escapement wheel and sprocket are thereby prevented from further rotation in a feeding direction. The pendulum member can not swing upwardly beyond a vertical position since the supporting lever 85 is held against further movement in this direction by shaft 79. However, the pendulum member can swing rearwardly and movement of the same in this direction will take place as a result of upward tilting movement of the entire device. The resulting rotation of escapement disc 78 is such as to move portion 91 out of contact with pin 77 and rotation of the sprocket will thereupon take place to advance the film. The rotation, however, is limited to half a revolution since the pins 77 are diametrically opposed and thus release of one pin will position the other pin in its place. With the pendulum member positioned vertically a pin 77 will be able to pass under portion 90. However, if the pendulum member is held in a rearwardly inclined position, portion 90 will have movement downwardly to a sufficient extent to form a stop for pin 77, as shown in Figure 9. This action of the parts will indicate to the user of the device that the operation of advancing a portion of the film has taken place to substantially full completion. The head can then be moved down to its former position as shown in Figure 1 and with the return of the pendulum member to vertical the portion 90 will release pin 77 and the necessary additional movement of the pin and sprocket will take place to completely advance the film. This is indicated when the pin comes into engagement with portion 91 and no further movement of the sprocket wheel can take place until another escapement operation is initiated by rearward movement of the pendulum member. As long as the head of the user is maintained in a substantially horizontal position or below horizontal the pendulum member will be held against actuation. Only by tilting the head and thus tilting the entire device can the pendulum member be caused to swing rearwardly to effect an escapement operation, permitting the film to advance, and which advancement is measured by a half revolution of the sprocket wheel. It will be obvious to those skilled in the art that the pendulum member may be actuated by electric means under the control of the user or by a timing device or other conventional mechanism.

Figure 16 shows a modified structure wherein the hub portion 72 of the escapement wheel 71 is extended upwardly for the purpose of providing at its upper end a ratchet wheel 92. A pawl 93 is yieldingly held by spring 94 in contact with the ratchet wheel which comprises teeth directed so that the pawl will prevent rotation of the escapement wheel in a clockwise direction, Figure 4, which might otherwise take place during rewinding of the film. It will be clearly understood that the escapement wheel will be permitted to rotate in a counter-clockwise direction by ratchet teeth 92 and pawl 93, since movement in this direction is necessary in the feeding of the film to advance the film to the optical system, which operation will take place following each actuation of the escapement disc 98 by the pendulum member as above described.

*Spring motor and wind-up spool*

In the embodiment of the device illustrated in the drawings a spring energized motor is shown which imparts rotation to a wind-up spool through mechanism including planetary gearing which will now be described.

The shaft 95 of the motor, Figure 11, is held against rotation and suitably supported in a vertical position by the lower support 96 secured by screws 97 to the bottom wall 24 of the frame. The lower end of shaft 95 is squared as at 98 and said squared end fits within an opening of similar shape provided therefor in the support 96. The upper end of the shaft is located within a central bore provided in the rotatable member 100, having the bearing portion 101 which extends through an opening in the top wall 23. The member 100 provides means for winding up the helical spring 102 forming the power means for the spring motor. The bearing plate 103 is positioned in contact with the projecting end of bearing 101 and the portion extending centrally through the bearing has fixed thereto the lever 104 by means of screw 105. The handle 106 is provided so that the member 100 may be rotated for the purpose of winding up the spring. The inner end of the helical spring is fixed to the rotatable member 100 by means of the projection 107, whereas, the outer end of the spring is releasably fixed to an upstanding flange 108 formed integral with the gear wheel 110 by means of a slot in said flange and a bent portion 111 on the spring which enters said slot. Said bent portion may be heat treated to impart the desired toughness thereto or the same may be reinforced in any other suitable manner. The bent portion will maintain its location within the slot provided therefor unless the helical spring is wound too tight. If this should take place the outer end of the spring will automatically release itself from flange 108 of gear wheel 110, which action permits the spring to unwind. When sufficient unwinding has taken place the bent portion 111 will automatically be reinserted within the slot whereby operative connection is again made with gear wheel 110. Rotatable member 100 is provided with ratchet teeth 112 on the periphery thereof and a pawl 113, pivotally supported from top wall 23, is held in contact with the ratchet teeth by coil spring 114. The pawl functions to hold the rotatable member in a wound-up position whereby the energy stored in the helical spring will be imparted through flange 108 to the gear wheel 110, causing operation of the planetary gearing carried by said gear wheel.

Gear wheel 110 is mounted on shaft 95 for rotation independently thereof by means of spaced discs 115 and 116, each of said discs being suitably fixed non-rotatably to shaft 95. The inner periphery of gear wheel 110 is positioned between said discs which therefore mounts the gear wheel for rotation independently of the shaft although maintaining the gear wheel concentric therewith. The planetary gearing shown in Figure 13 is located on the underside of gear wheel 110, the pinions 117 and 118 thereof being rotatably mounted on disc 116 by the headed screws 119 provided therefor. The said pinions are in mesh with gear teeth 120 formed on the inner periphery of the integral depending flange provided by gear wheel 110 and said pinions also have meshing engagement with a sun gear 121 located centrally of the planetary gearing arrangement and comprising an integral part of the elongated hub 122 supported by and rotatably mounted on shaft 95. Since the gear wheel 110 receives rotary motion from the helical spring 102 the said gear wheel may be defined as the driving member of the motor mechanism. Motion is transmitted through the planetary pinions 117 and 118 to the sun gear 121 and thus to the elongated hub which comprises the driven member of the motor. The action of the planetary gearing is to speed up the rotation of hub 122 compared to that of gear wheel 110.

The wind-up spool for the film indicated in its entirety by numeral 123 is rotatably mounted with respect to hub 122 and the lower central portion thereof is provided with a recess for receiving clutch structure to be presently described, whereby an operative connection is effected between the wind-up spool and hub 122. The wind-up spool includes a lower flange 124, circular in shape, and an upper flange 125, slightly greater in diameter than flange 124, and having formed on the periphery thereof ratchet teeth 126. The clutch for the wind-up spool includes a clutch member 127 having teeth 128 on the upper surface thereof and similar teeth 130 on the lower surface. The clutch member has an interlocking connection with hub 122 through projection 131 provided by its sleeve 132 fitted to the hub so as to rotate therewith. The interlocking connection 131 joins the clutch member and hub while permitting limited vertical movement of the clutch member effected by collar 133 having surrounding relation with said clutch member. When the clutch member is positioned upwardly so as to have contact with the wind-up spool it will be observed that teeth 128 of the clutch member will have engagement with teeth 134 provided by the spool. This action interlocks the clutch member with the spool and any rotation of hub 122 is imparted through the clutch member to said spool, causing a winding up of the film thereon. The clutch member may be located in an inoperative position by actuation of collar 133 through lever 135 having a bifurcated end pivotally connecting therewith. When the clutch member is in said inoperative position the teeth 130 on the under surface thereof will be in engagement with teeth 136 provided by the stationary bearing 96. The clutch member is thus disconnected from the wind-up spool but rotation of the member and hub 122 is prevented since teeth 130 thereof have interlocking association with said stationary bearing. Movement of the clutch member from its upper operative position to a lower inoperative position and vice versa is effected by lever 135 having a fulcrum point at 137 with member 138 suitably fixed to the bottom frame 24. The actuating button 140 is mounted for longitudinal movement in slot 141 in the bottom wall 24 and as clearly shown in Figure 11, said button may have contact with lever 135 on either side of the fulcrum 137. When located on the right hand side of said fulcrum, as in Figure 11, the clutch member is caused to assume an operative position whereby the teeth 128 thereof are interlocked with teeth 134 of the wind-up spool. When the button 140 is located in a left hand position the lever 135 will be oscillated to cause the clutch member to move downwardly and thus assume an inoperative position wherein the driving hub 122 will be locked by the interaction of teeth 130 with teeth 136.

The film is releasably fixed to the hub of the wind-up spool 123 by the structure shown in Figure 14 which includes a pivoted gate 142 pivoted to the wind-up spool at 143 and when in closed position having contact with portion 144. The gate 142 is held in either closed or open position by the spring 145 having contact with the journalling portion of the gate, the spring in turn being suitably anchored to the wind-up spool by the securing screw 146. Portion 144 is formed with projections 147 located in spaced relation on the same so as to project through the sprocket openings formed in the film on the respective sides thereof. This functions to anchor the film to the wind-up spool and the anchorage thus effected is maintained by closing gate 142, said gate being provided with the necessary openings 148 to permit the said projections 147 to extend through the gate.

For winding the helical spring 102 of the motor means the operator rotates lever 104 through handle 106. Energy is accordingly stored up in the spring and the rotatable member 100 is prevented from unwinding as a result of the latching pawl 113 having engagement with the ratchet teeth 112 formed on the periphery of said member. When it is desired to wind up film on the spool 123 the lever 135 is actuated, as shown in Figure 11, by movement of button 140 to locate the clutch member 127 in operative position wherein the same will have interconnecting relation with the wind-up spool. Gear wheel 110 is caused to rotate through the energy imparted thereto by the helical spring 102. This energy is transmitted through the planetary gearing to hub 122 and from said hub through the clutch member to the wind-up spool. The clutch member is constructed so that teeth 134 of the wind-up spool are released only after teeth 136 have become engaged thereby. Therefore the clutch member 127 does not have a neutral position and by eliminating the neutral position it is impossible to unwind the motor except through rotation of the wind-up spool.

*Film tension lock*

The film tension lock includes a freely rotating spool 150, Figures 11 and 15, adapted to have contact with the film and which is suitably supported for rotation by lever 151. Said lever is pivoted at 152 substantially centrally thereof to disc 153 which forms the lower part of a depending standard 154 suitably secured by screws 155 to the top wall 23. The end of lever 151, directed inwardly opposite spool 150, carries a pin 156 having location within an elongated slot 157 formed in arm 158 of the bell crank lever, having the pawl 160 as the other arm thereof. The bell crank lever is pivotally supported by pin 161 to the undersurface of disc 153. The pawl 160 is adapted to have interlocking connection with the ratchet teeth 126 provided by the upper circular flange 125 of the wind-up spool. The teeth are formed on said spool in a direction so that when pawl 160 is in engagement therewith the wind-up spool is prevented from rotating in a counterclockwise direction, Figures 4 and 15, which direction is necessary for winding the film thereon. However, in accordance with the invention, the pawl 160 is automatically released from engagement with the ratchet teeth on the wind-up spool when a predetermined tension has been placed on the film 38. This will be clearly understood by reference to Figure 4 wherein it will be observed that film 38 is in contact with spool 150, and with a predetermined tension existing in the film the spool 150 will be caused to move inwardly, oscillating lever 151, causing actuation of pin 156 on the inner end of the lever to ride within slot 157 and actuate the bell crank to release pawl 160. In the event the film should break or at the end of the film when the same becomes released from the supply spool 48, the motor would otherwise have a tendency to run away. This is prevented by the film tension lock since automatically with the elimination of the tension in the film the spool 150 will move outwardly since the same is biased in this direction by the coil spring 162 having connection at one end with pin 156 and at its other end with the depending stud shaft 163. This film tension lock does not, however, interfere with the rewinding of the film since the wind-up spool may be rotated in a clockwise direction, Figure 4, even though pawl 160 is in engagement with ratchet teeth 126.

With the clutch member 127 in operative position to cause winding of the film onto the wind-up spool 123, and assuming that the film tension lock has been released, it will be understood that the film will nevertheless remain stationary since advancement of the same to the optical system is controlled by the escapement mechanism in associated relation with sprocket 67. When the escapement disc 78 is rotated in the proper direction by the pendulum member, the escapement wheel 71 is released and the sprocket is thereupon permitted to rotate for not more than half a revolution, whereby the film is advanced to the optical system to bring another set of pictures in alignment with the frame openings 40 and 41. When the sprocket rotates to advance the film the same is automatically wound up on the wind-up spool 123. Throughout this operation and succeeding operations the motor and wind-up spool remain operative to cause travel of the film through the device. For the educational purposes of the device each pair of pictures will be viewed for an interval of time depending on the particular user of the device and the film will therefore be advanced intermittently. Each advancement is initiated by the user by actuation of the pendulum member. In the illustrated embodiment the pendulum member is actuated by bodily movement of the entire device. It is of course possible to impart movement to the pendulum member by a timing device, by electrical means, or by any other conventional mechanism. When actuated, portion 91 releases pin 77 in contact therewith and the escapement wheel is free to rotate. The sprocket will rotate therewith and the film is accordingly unwound from the supply spool, caused to advance with respect to the optical system, and is wound on the wind-up spool.

Figures 17 and 18 illustrate the positioning of pictures on sixteen millimeter film and thirty-five millimeter film, respectively, to adapt said film to the present educational device. In Figure 17 the sixteen millimeter film is provided with pictures 165 and 165' located in spaced relation on the film and which pictures extend longitudinally for two conventional frames. These pictures are therefore rectangular in shape and in accordance with the invention each pair of pictures is spaced by a single frame indicated by numeral 166. When positioned in alignment with the frame openings 40 and 41 it will be seen that the pictures are correctly outlined by said frames and that the space 166 is approximately the same as the space between the said frame openings. The location of pictures 167 and 167' on thirty-five millimeter film follows somewhat the same arrangement as above outlined. In this instance each picture extends longitudinally of the film for approximately five of the sprocket openings, whereas, the space between pictures includes only two of the sprocket openings. Therefore, the space between is somewhat less than the longitudinal distance of the pictures. In adapting film to the present device the space between pictures should be equal to about one-half of the longitudinal distance of the picture or slightly less than one-half. The illustrated embodiment of the device will not take thirty-five millimeter film, as shown in Figure 18. For this film it is necessary to construct a device wherein the spools, sprocket and optical system is of a width to accommodate the film.

The spacing of the pictures on the film as above described has a number of desirable advantages. In the first place, it enables the location of lenses such as 33 and 34 at the proper pupillary distance for viewing the pictures through mirrors and does not require an optical system of excessive depth. Another advantage enables the film to be spliced in a manner to maintain the proper corelation and spacing of the pictures. The splicing is shown in Figure 19 with respect to sixteen millimeter film. The space between any pair of pictures is severed so as to retain approximately two-thirds of the space. For example, with respect to film strip 170 the space is severed so that approximately two-thirds of the space remains, forming portion 171. The same operation is performed on the film strip 172 and it will therefore be understood that portion 173 is approximately two-thirds of a conventional frame. In splicing the film strips this permits an overlap of one-third which is sufficient for the purpose and the pictures will be in proper position for adapting the same to the present device, with the sprocket openings also in proper spaced relation.

An arcuate or crescent shape, when viewed in top plan, has been purposely chosen for the present device since it makes for compactness with proper spacing and accessibility of the various elements. In order to unwind the film from one spool, pass the same over sprocket means, in front of optical means where the pictures may be viewed, and to eventually wind the film onto a wind-up spool requires a certain minimum distance which if directed in a straight line would be excessive for a device of this character. However, as a result of the crescent shape the spools and other mechanism can be located at the terminal end portions of the device and since the optical means is located centrally thereof this automatically positions the optical means at a distance outwardly from the eyes of the user. The mechanism which adds weight to the device is thus located adjacent the forehead of the user and this is desirable since the device is much easier to balance and the same can be worn on the forehead for long periods without undue annoyance. An important feature of the device is secured primarily as a result of the shape thereof and this concerns the bi-focal aspect previously referred to which enables full realization of the educational features. The arcuate or inwardly directed terminal end portions which fit against the forehead of the user at the temples or relatively adjacent thereto perform the dual function of side walls, cutting off extraneous light which would otherwise interfere with the sight of the user. When the device is designed for viewing pictures and permitting the user to also direct his eyes downwardly the band 22 is fitted to the top wall, and the bottom wall is provided with an inwardly extending portion having a formation 25 for the purpose. Therefore substantially all extraneous light is kept from the eyes of the user and yet he is able to cast the eyes forward for viewing the pictures presented by the film and to also cast his eyes downwardly for the purpose of returning or performing other functions with the hands. It will be understood that the position of band 22 and formation 25 may be reversed in the event the user desires to cast his eyes upwardly for performing work on a wall or viewing information that may be displayed on the ceiling or the like.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In a device of the kind described, the combination with a frame providing an optical system for viewing pictures on a strip of film, a supply spool journalled by said frame and located on one side of the optical system, a wind-up spool also journalled by said frame and located on the other side of said optical system, motor means for said wind-up spool whereby the same is rotated to wind the film thereon, means also housed by said frame and constructed and arranged to permit advancement of said film to the optical system intermittently and to an extent conforming to said system, and locking means for said wind-up spool preventing rotation thereof in a direction to wind the film except when the same is under a predetermined tension.

2. In a visual educational device, a frame for securement to the head of a person in alignment with the eyes, an optical system provided by said frame substantially centrally thereof for viewing pictures on a film strip in stereoscopic relief, a supply spool journalled by the frame and located on one side of the optical system, a wind-up spool journalled by the frame on the other side of the optical system, motor means for rotating the wind-up spool to wind film thereon, means for advancing the film under the control of the user including a sprocket having contact with the film and normally operative to hold the film against movement, and escapement means for releasing said sprocket to permit limited rotation thereof for each actuation of said escapement means.

3. In a visual educational device, a frame for securement to the head of a person in alignment with the eyes, an optical system provided by said frame substantially centrally thereof for viewing pictures on a film strip in stereoscopic relief, a supply spool journalled by the frame and located on one side of the optical system, a wind-up spool journalled by the frame on the other side of the optical system, motor means for rotating the wind-up spool to wind film thereon, a sprocket journalled for rotation by said frame and located on the side of the optical system adjacent the supply spool, an escapement wheel operatively associated with said sprocket for holding the sprocket against rotation in a direction to advance the film to the optical system when the said wheel is held against movement in said direction, and escapement means for controlling the release of said escapement wheel.

4. In a visual educational device, a portable frame, an optical system provided by said frame substantially centrally thereof for viewing pictures on a film strip, a supply and wind-up spool journalled by the frame on the respective sides of the optical system, motor means for rotating the wind-up spool, locking means for locking the wind-up spool in a direction to wind film thereon including ratchet teeth formed on the periphery of said wind-up spool and a pivotally mounted pawl having engagement with said ratchet teeth, and a movable member operating to release said locking means upon movement thereof, said member having movement proportional to the tension on the film strip, whereby the locking means remains released as long as the film is under tension.

5. In a visual educational device, a portable frame, an optical system provided by said frame substantially centrally thereof for viewing pictures on a film strip, a supply and wind-up spool journalled by the frame on the respective sides of the optical system, motor means for rotating the wind-up spool, locking means for locking the wind-up spool in a direction to wind film thereon including ratchet teeth formed on the periphery of said wind-up spool and a pivotally mounted pawl having engagement with said ratchet teeth, and a movable member operating to release said locking means upon movement thereof to a certain extent, said member having movement proportional to the tension on the film strip, whereby the locking means remains released as long as the film is under a predetermined tension.

6. In a visual eductional device, a portable frame, an optical system provided by said frame substantially centrally thereof for viewing pictures on a film strip, a supply and wind-up spool journalled by the frame on the respective sides of the optical system, motor means for rotating the wind-up spool, ratchet teeth formed on the periphery of said wind-up spool, a pivoted pawl having engagement with said teeth to thereby lock the wind-up spool against rotation in a direction to wind film thereon, means for releasing said pawl including a movable member operatively connected with the pawl and normally in contact with the film, whereby the member has movement in proportion to the tension on said film, and said member having movement sufficient to release the pawl when said film is under a predetermined tension.

7. In a visual educational device, a portable frame, an optical system provided by said frame substantially centrally thereof for viewing pictures on a film strip, a supply and wind-up spool journalled by the frame on the respective sides of the optical system, motor means for rotating the wind-up spool, a sprocket journalled by the frame and having interlocking contact with the film whereby advancing of the film is proportional to the rotation of the sprocket, and escapement means normally locking the sprocket against rotation in a film advancing direction but permitting release of the sprocket upon actuation of said means, said escapement means including a gravity operated weight whereby said means may be actuated by bodily movement of the device.

8. In a visual educational device, a portable frame, an optical system provided by said frame substantially centrally thereof for viewing pictures on a film strip, a supply and wind-up spool journalled by the frame on the respective sides of the optical system, motor means in associated relation with the wind-up spool for rotating the same in a direction to wind film thereon, a sprocket journalled by the frame and having interlocking contact with the film whereby advancing of the film is proportional to rotation of the sprocket, an escapement wheel mounted for rotation coaxially with said sprocket and having connection therewith whereby the sprocket is held against rotation in a film advancing direction when the escapement wheel is held against movement in the same direction, and escapement means controlling release of the escapement wheel.

9. In a visual educational device, a portable frame, an optical system provided by said frame substantially centrally thereof for viewing pictures on a film strip, a supply and wind-up spool journalled by the frame on the respective sides of the optical system, motor means in associated relation with the wind-up spool for rotating the same in a direction to wind film thereon, a sprocket journalled by the frame and having interlocking contact with the film whereby advancing of the film is proportional to rotation of the sprocket, an escapement wheel mounted for rotation coaxially with said sprocket and having connection therewith whereby the sprocket is held against rotation in a film advancing direction when the escapement wheel is held against movement in the same direction, and escapement means in associated relation with the escapement wheel and having a locking and a release position with respect thereto, said means in locking position providing a stop member holding the wheel and thus the sprocket against rotation in a film advancing direction and in a release position permitting said rotation to a limited extent.

10. In a visual educational device, a portable frame, an optical system provided by said frame substantially centrally thereof for viewing pictures on a film strip, a supply and wind-up spool journalled by the frame on the respective sides of the optical system, motor means in associated relation with the wind-up spool for rotating the same in a direction to wind film thereon, a sprocket journalled by the frame and having interlocking contact with the film whereby advancing of the film is proportional to rotation of the sprocket, an escapement wheel mounted for rotation coaxially with said sprocket and having connection therewith whereby the sprocket is held against rotation in a film advancing direction when the escapement wheel is held against movement in the same direction, and escapement means in associated relation with the escapement wheel and having a locking and a release position with respect thereto, said means when in a locking and also a release position providing a stop member for the escapement wheel.

11. In a visual educational device, a portable frame, an optical system provided by said frame substantially centrally thereof for viewing pictures on a film strip, a supply and wind-up spool journalled by the frame on the respective sides of the optical system, motor means in associated relation with the wind-up spool for rotating the same in a direction to wind film thereon, a sprocket journalled by the frame and having interlocking contact with the film whereby advancing of the film is proportional to rotation of the sprocket, an escapement wheel mounted for rotation coaxially with said sprocket and having a pawl and ratchet connection therewith whereby the sprocket is held against rotation in a film advancing direction when the escapement wheel is held against movement in the same direction, and escapement means in associated relation with the escapement wheel and having a locking and a release position with respect thereto, said escapement means in moving from a locking to a release position effecting release of the wheel and automatically positioning a stop member to limit the extent of rotation permitted by said release.

12. In a visual educational device, the combination with a frame providing optical means for viewing pictures on a strip of film, of a supply spool on one side of the optical means containing a supply of said film, a wind-up spool on the other side of said optical means, a stationary shaft supported by the frame for journalling the wind-up spool, spring energized motor means co-axially positioned at one end of the said spool, a clutch member mounted on said stationary shaft and located at the other end of said spool, and planetary gearing positioned between the motor means and the spool, said gearing and clutch member comprising mechanism for operatively connecting the motor means with the wind-up spool.

13. In a visual educational device, the combination with a frame providing optical means for viewing pictures on a strip of film, of a supply spool on one side of the optical means containing a supply of said film, a stationary shaft supported by the frame on the other side of the said optical means, a driven member journalled by said shaft, a wind-up spool mounted for independent rotation on the driven member, motor means coaxially positioned at one end of the wind-up spool, a clutch member mounted on said driven member at the other end of the spool, gearing positioned between the motor means and the spool for operatively connecting said means with the driven member, and said clutch member in operative position connecting the driven member with said wind-up spool.

14. In a visual educational device, the combination with a frame providing optical means for viewing pictures on a strip of film, of a supply spool on one side of the optical means containing a supply of said film, a shaft supported by the frame on the other side of the said optical means, a driven member journalled by said shaft, a wind-up spool mounted for independent rotation on the driven member, a clutch member mounted on said driven member for rotation therewith and having limited axial movement relative thereto, said clutch member in one position connecting the driven member with the wind-up spool and in its other position locking the driven member against rotation.

15. In a visual educational device, the combination with a frame providing optical means for viewing pictures on a strip of film, of a supply spool on one side of the optical means containing a supply of said film, a stationary shaft supported by the frame on the other side of the said optical means, a driven member journalled by said shaft, a wind-up spool mounted for independent rotation on the driven member, motor means operatively connected to the driven member for rotating the same in a film winding direction, a clutch member mounted on said driven member for rotation therewith and having limited axial movement relative thereto, said clutch member in one position connecting the driven member with the wind-up spool and in its other position locking the driven member against rotation.

16. In a device of the kind described, the combination with a portable frame substantially arcuate in shape when viewed in top plan, of optical means located centrally of said frame for viewing pictures on a strip of film caused to advance with respect thereto, a supply spool located within one terminal end portion of said frame on one side of the optical means, a wind-up spool located within the other terminal end portion of the frame on the other side of the optical means, a fastening member fixed to one wall of said frame for releasably securing the device to the head of a user, and said terminal end portions of the frame additionally providing side walls for shielding the eyes of the user from extraneous light coming from the respective directions thereof.

17. In a visual educational device, a portable frame for securement to the head of a person in alignment with the eyes, an optical system provided by said frame substantially centrally thereof for viewing spaced pictures on a film strip in stereoscopic relief, a supply compartment within said frame and located on one side of the optical system, a film receiving compartment within the frame and located on the other side of the optical system, said optical system including a directing and guiding member for the film having picture openings, a rotatable sprocket wheel journalled by the frame and adapted to engage the film in the vicinity of one end of said member, whereby movement of the film is dependent on rotation of the sprocket wheel to a proportional extent, and mechanism for controlling rotation of the sprocket wheel in a film advancing direction, said mechanism including a gravity actuated pendulum adapted to have movement upon bodily movement of the device in predetermined directions.

18. In a visual educational device, a portable frame adapted to be releasably fitted to the head of a user and supported thereby, optical means located substantially centrally of the frame for viewing stereoscopic pictures on a strip of film caused to advance with respect thereto, said frame also providing a directing and guiding member for the film having picture openings, a sprocket wheel journalled by the frame and having interlocking contact with the film, whereby advancement of the film is proportional to rotation of the sprocket wheel, mechanism for controlling the rotation of the sprocket wheel in a film advancing direction including a pivotally supported pendulum weight having swinging movement for control purposes as a result of bodily movement of the device in predetermined directions, and means operatively connecting the pendulum weight with the sprocket wheel.

19. In a device of the character described, a portable frame for securement to the head of a person in alignment with the eyes, an optical system provided by said frame substantially centrally thereof for viewing pictures on a strip of film, a supply compartment within said frame and located on one side of the optical system, a film receiving compartment within the frame and located on the other side of the optical system, said optical system including a directing and guiding member for the film having at least one picture opening, a rotatable sprocket wheel journalled by the frame and adapted to engage the film to cause advancing movement of the film proportional to the extent of rotation of the sprocket wheel, and mechanism for controlling rotation of the sprocket wheel in said film advancing direction, said mechanism including a gravity actuated weight adapted to have movement upon bodily movement of the device in predetermined directions.

20. In a visual educational device, the combination with a frame providing optical means for viewing pictures on a strip of film, of a supply spool on one side of the optical means containing a supply of film, a wind-up spool on the other side of said optical means, a shaft supported by the frame on said other side of the optical means, said shaft journalling the wind-up spool, spring energized motor means coaxially positioned at one end of said spool, a clutch member mounted on said shaft and located at the opposite end of said spool, and means including gearing located between the clutch member and motor means for operatively connecting the motor means thereto, said clutch member in one position engaging with the spool and in its other position engaging the frame to lock the motor means against operation.

JOSEPH F. JAROS.